United States Patent
Koehler et al.

(10) Patent No.: US 7,162,532 B2
(45) Date of Patent: Jan. 9, 2007

(54) SYSTEM AND METHOD FOR LISTENING TO TEAMS IN A RACE EVENT

(76) Inventors: Steven M. Koehler, 35 Crystal Creek Rd., Orono, MN (US) 55356; Eric K. Moe, 641 W. Country Club Dr., Purcellville, VA (US) 20132

( * ) Notice: Subject to any disclaimer, the term of this patent is extended or adjusted under 35 U.S.C. 154(b) by 0 days.

(21) Appl. No.: 10/060,800

(22) Filed: Jan. 30, 2002

(65) Prior Publication Data
US 2002/0138587 A1    Sep. 26, 2002

Related U.S. Application Data

(63) Continuation-in-part of application No. 09/128,896, filed on Aug. 4, 1998, now abandoned.

(60) Provisional application No. 60/075,659, filed on Feb. 23, 1998.

(51) Int. Cl.
G06F 15/16 (2006.01)
G06F 17/00 (2006.01)
G06F 19/00 (2006.01)
A63F 9/24 (2006.01)
A63F 13/00 (2006.01)

(52) U.S. Cl. .......................... 709/231; 463/40

(58) Field of Classification Search ................ 463/40, 463/42, 58, 59; 709/204, 205, 219, 206–207, 709/230–232; 345/753–758; 715/753–758
See application file for complete search history.

(56) References Cited

U.S. PATENT DOCUMENTS

| | | | | |
|---|---|---|---|---|
| 4,059,735 A | * | 11/1977 | Betts | 370/268 |
| 4,449,114 A | | 5/1984 | Fascenda et al. | 340/23 |
| 5,189,630 A | | 2/1993 | Barstow et al. | 364/514 |
| 5,491,743 A | | 2/1996 | Shiio et al. | 379/202 |
| 5,564,977 A | | 10/1996 | Algie | 463/25 |
| 5,663,717 A | | 9/1997 | DeLuca | 340/825.36 |
| 5,666,101 A | | 9/1997 | Cazzani et al. | 340/323 |
| 5,696,706 A | | 12/1997 | Morton et al. | 364/565 |
| 5,768,527 A | | 6/1998 | Zhu et al. | 395/200.61 |
| 5,812,937 A | * | 9/1998 | Takahisa et al. | 455/66.1 |
| 5,894,320 A | | 4/1999 | Vancelette | |
| 5,946,635 A | | 8/1999 | Bominguez | 455/558 |
| 5,991,385 A | | 11/1999 | Dunn et al. | 379/202 |
| 6,020,851 A | | 2/2000 | Busack | 342/457 |
| 6,044,403 A | | 3/2000 | Gerszberg et al. | 709/225 |

(Continued)

FOREIGN PATENT DOCUMENTS

CA    2348353    5/2001

(Continued)

OTHER PUBLICATIONS

Schmiedel, "Motor Sports Now Hear This! Drivers-crew Conversations on the Web," Nov. 30, 1997, Providence Journal, p. E.1.*

(Continued)

*Primary Examiner*—Glenton B. Burgess
*Assistant Examiner*—Sean Reilly
(74) *Attorney, Agent, or Firm*—Westman, Champlin & Kelly, P.A.

(57) ABSTRACT

A computer-implemented method and system allows a remote computer user to listen to teams in a race event. The method includes receiving audio signals from a plurality of audio sources at the race event; transmitting at least some of the audio signals to a remote computer; and filtering the audio signals as a function of the source of at least some of the audio signals so that at least some of the audio signals are not played by the remote computer and heard by the user.

47 Claims, 5 Drawing Sheets

U.S. PATENT DOCUMENTS

| | | | |
|---|---|---|---|
| 6,055,419 | A | 4/2000 | Beard .......................... 455/142 |
| 6,080,063 | A * | 6/2000 | Khosla ........................ 463/42 |
| 6,093,880 | A | 7/2000 | Arnalds ....................... 84/464 |
| 6,106,399 | A | 8/2000 | Baker et al. .................. 463/42 |
| 6,195,090 | B1 | 2/2001 | Riggins, III ................. 345/327 |
| 6,396,509 | B1 * | 5/2002 | Cheng ......................... 345/706 |
| 6,728,784 | B1 * | 4/2004 | Mattaway ...................... 709/245 |
| 2001/0003715 | A1 * | 6/2001 | Jutzi et al. .................... 463/40 |
| 2002/0063799 | A1 | 5/2002 | Ortiz et al. |
| 2005/0050575 | A1 | 3/2005 | Arseneau |

FOREIGN PATENT DOCUMENTS

| | | |
|---|---|---|
| EP | 0578201 A2 | 1/1994 |
| WO | WO 97/08896 | 3/1997 |
| WO | WO 98/41020 | 5/1997 |
| WO | WO 01/0008417 | 7/2000 |

OTHER PUBLICATIONS

Abbott, "Viewers at Home, Advertisers Enjoying the Ride with NASCAR Racing is Zooming on TV and Online—With a Winning Combination of Ratings and Demographics," Feb. 16, 1997, Orlando Sentinel, p. A.20.*

Sandrige et al.; Scanner questions: purchase and strategy; Google Groups post, Feb. 1995.*

Uniden BC 120XLT Manual, 1994.*

RadioShack PRO-74 Race Scanner Manual; 1998.*

Schmiedel; Motor Sports Now hear this! Drivers-crew conversations on the Web; Providence Journal—Bulletin; Nov. 1997.*

Tedesco; ESPN extends NASCAR deal; ESPN; Jul. 20th, 1998.*

Machlis; AlliedSignal races to the Web; Computerworld; Nov. 1997.*

HS100 Portable AM/FM Scanner:, Instruction Manual, RELM Communications, Inc., Jun. 1996, pp. 1-19.

"40th Annual NASCAR Winston Cup Series Daytona 500", Exclusive Jeff Gordon In-Car Radio Transmission Live—Internet Site, Feb. 15, 1998.

Dutta-Roy, "Virtual Meetings with Desktop Conferencing," Jul. 1998, IEEE Spectrum, pp. 47-56.

Tedesco, "ESPEN extends NASCAR deal", Jul. 20, 1998, Broadcasting & Cable, vol. 128, Issue 30, p. 61.

"In-Car Audio", 1999, ESPN Network.

"Raceaudio To Provide Live In-Car-Audio Feeds to IMS Websites" 1998.

"Turner, NASCAR partner for Internet rights", NASCAR News, Oct. 10, 2006.

* cited by examiner

SYSTEM AND METHOD FOR LISTENING TO TEAMS IN A RACE EVENT

CROSS-REFERENCE TO RELATED APPLICATION

This application is a continuation-in-part of application Ser. No. 09/128,896, filed Aug. 4, 1998, which claims the benefit of provisional patent application serial No. 60/075,659, filed Feb. 23, 1998, both of which are incorporated herein by reference.

BACKGROUND OF THE INVENTION

The present invention relates to race events. More particularly, the present invention allows a person to listen to communications of race teams participating in a race event where the person is remote from the race event.

Race events, such as motor vehicle racing, are a steadily growing sport. In many forms of racing, a driver communicates with a crew during the race to discuss strategy and vehicle performance. The communications are commonly listened to by fans at the race event, allowing the fans to become more involved during the race. However, the transmitters used are not powerful and are generally limited in range so as to function within the area of the race track. Thus, only those fans at the race have the ability to listen to the race communications. For fans watching the race remotely, such as on television, the communications are not generally available except for occasional excerpts provided by the race broadcaster.

SUMMARY OF THE INVENTION

A computer-implemented method and system allows a remote computer user to listen to teams in a race event. The method includes receiving audio signals from a plurality of audio sources at the race event; transmitting at least some of the audio signals to a remote computer; and filtering the audio signals as a function of the source of at least some of the audio signals so that at least some of the audio signals are not played by the remote computer and heard by the user.

BRIEF DESCRIPTION OF THE DRAWINGS

FIG. 2 is a user interface for selecting which race communications to listen to.

DETAILED DESCRIPTION OF THE PREFERRED EMBODIMENTS

Figure 1:
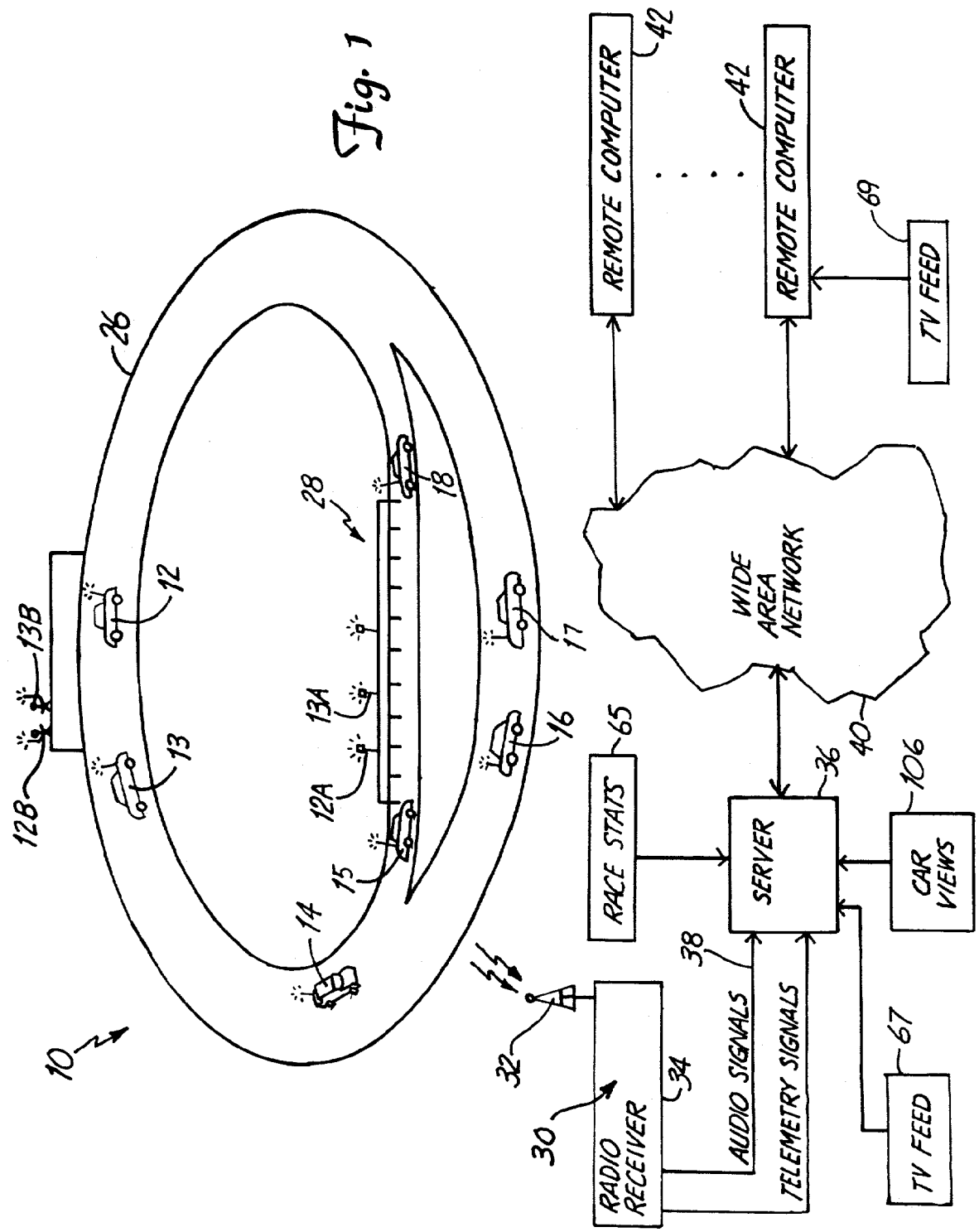
FIG. 1 is a pictorial representation of a race event and a system of the present invention for monitoring race communications and providing the communications to a remote fan.

A race event is illustrated in FIG. 1 at 10. In the embodiment illustrated, the race event 10 is a motor vehicle race involving a plurality of cars at 12, 13, 14, 15, 16, 17 and 18. The cars race on an oval track 26. The track 26 includes a pit area 28 used for periodic refueling and maintenance of the cars 12–18 during the race.

During the race, the driver of each of the cars 12–18 are in communication with team members located in the pit area 28. The drivers of the cars 12–18 discuss race strategy including when to perform refueling and maintenance on the car during the race. Generally, each team is assigned a particular channel or operating frequency to the exclusion of all other teams so that the driver and the team can communicate easily. In the embodiment illustrated, the driver of car 12 communicates with a team member located in the pit area 28, designated at 12A, while the driver of car 13 communicates with a team member 13A, also in the pit area 28.

In many race events, additional team members may be located at other areas on the track 26 during the race. For instance, a "spotter" 12B is also sometimes present during the race, The spotter 12B watches the race and communicates with the driver of car 12 and the team member 12A located in the pit area 28, providing relevant information concerning the race. For example, the spotter 12B informs the driver of car 12 when he has cleared another car during the race and can safely pass in front the other car. Likewise, a spotter 13B communicates with the driver of car 13 and the team member 13A in the pit area 28 similarly. As stated above, each of the teams for the cars 12–18 have team members in the pit area 28 and spotters communicating on separate assigned channels.

FIG. 1 further illustrates a system 30 of the present invention that allows a remote fan to selectively listen to communications made by the team members of each team during the race. The system 30 includes an antenna 32 tar picking up all communications made between the team members of each team during the race. A radio receiver 34 is connected to the antenna 32 and provides the communications to a computer 36 as audio signals 38. The computer 36 is located at the race track 26 or remote therefrom. However, whether located at the track 26 or remote therefrom, the computer 36 is connected to a wide area network 40, such as the Internet. A remote race fan uses a remote computer 42 connectable to the wide area network 40, and accesses the computer 36 (hereinafter "server") in order to receive information from the server 36 indicative of the audio signals 38 and, thus, the communications of the race event 10.

The server 36 and the remote computer 42 can be a personal computer, laptop computer or other suitable computing device connectable to the wide area network 40 using phone lines, cable lines, satellite links, or other suitable communication means. Generally, the remote computer 42 includes a display or monitor, an input device, such as a keyboard or a mouse, and speaker, not shown, but well known. The remote computer 42 further includes a suitable microprocessor and support peripherals such as random access memory (RAM), read only memory (ROM) and storage mediums such as a hard disk, floppy disk/drive and/or optical disk/drive communicating with each other over a system bus, again all well known in the art. Exemplary embodiments of the present invention described below include modules that can be implemented in hardware, software or a combination of both hardware and software.

Figure 2:
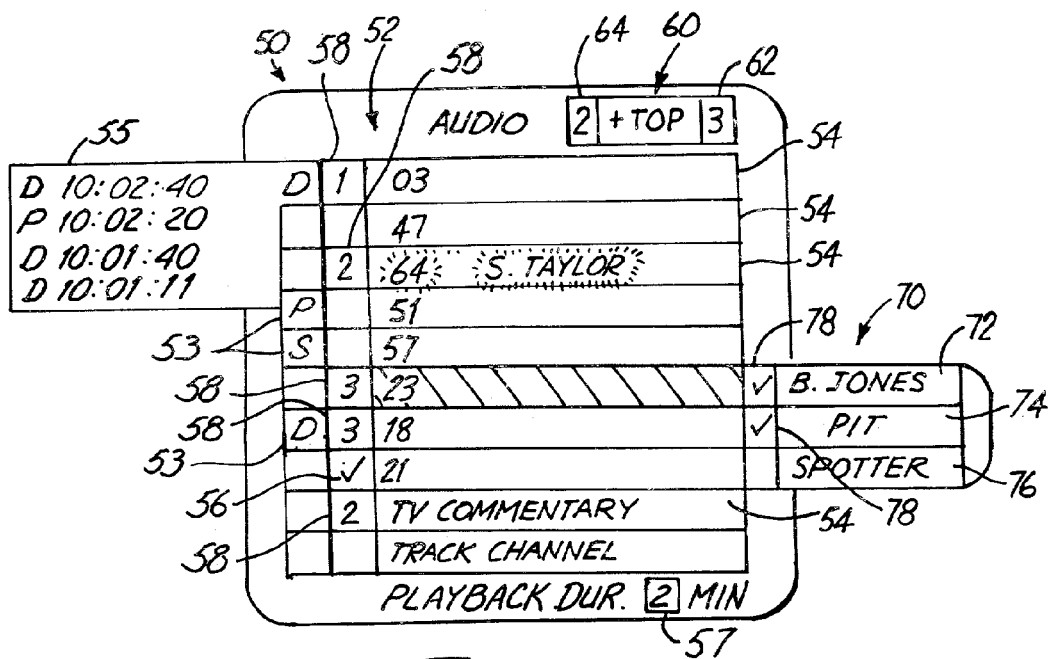

In a preferred embodiment of the present invention, the remote fan using the remote computer 42 can select any or all of the team communications to listen to during the race. FIG. 2 is an embodiment of a user interface 50 displayable on the monitor of the remote computer 42. The user interface 50 comprises a list 52 of each of the participants in the race. The list 52 includes unique identifiers 54, such as the car number or the team name, for each of the race participants. Using a suitable input device, such as a mouse, the remote fan selects any or all of the participants to listen to during the race using the unique identifiers 54.

In a first embodiment, selection of a race participant to listen to can be identified by a "check" indicated at 56 for the corresponding identifier 54. During the race, the communications pertaining to only those selected teams in the list 52 would be provided to the speaker of the remote computer 42 for listening by the remote fan. Communications of teams not selected in the list 52 would be filtered by either the server 36 or the remote computer 42 (if all of the communications are passed through the wide area network 40), and not provided to the speaker of the remote computer 42, In this manner, the remote fan can choose which participants to listen to during the race, while ignoring or filtering out all other communications. In a further embodiment, when there exists any communication between the driver, the pit area or the spotter, if present, of a selected participant in the list 52, the unique identifier 54 corresponding to the communication is uniquely identified in the list 52 so as to signify to the remote fan which team is currently being heard through the speaker of the remote computer 42. For instance, the unique identifier 54 can flash (as illustrated for team number 64), be presented in bold face or highlighted when communications are being heard over the speaker of the remote computer 42. As stated above, typically each team is assigned a unique channel or frequency, thus, identification of each communication is relatively easy.

In a further embodiment, the remote fan can prioritize the selected teams in the list 52. In the embodiment illustrated, a priority number is indicated at 58 for each of the teams selected. The highest priority team is herein indicated as "1", while the lowest priority team is indicated as "3", By prioritizing, the remote fan can be assured of hearing substantially all communications from a particular team, while still being able to hear most of the communications from other teams. For instance, if communications are currently being heard from a priority "2" team through the speaker of the remote computer 42 and communication starts for a priority "1" team, the audio being played over the speaker of the remote computer 42 will immediately switch to the priority "1" team. Likewise, if a priority "3" team communication is currently being heard and a priority "2" team communication begins, the speaker of the remote computer 42 will then start providing the priority "2" team communication. However, if during the playing of a communication, a lower priority communication begins, the lower priority communication will not be delivered by the speaker of the remote computer 42 until the communication of the higher priority communications suspends, which is typically signified by silence for a given time period. In addition, if during the communication of a priority team, another communication of a team having the same priority begins, the communication of the first playing team will not suspend until the communication is over. At that time, the communication of the other team having the same priority will then begin.

In a further embodiment, the list 52 can include other audio sources such as TV commentary provided by a broadcaster televising the race event 10. The list 52 can also include race or track officials broadcasting on a radio frequency at the race event 10, which is typically only heard by fans or participants at the race event 10. Like the teams in the list 52, the TV commentary and track channel can also be selected and/or prioritized in the manner described above.

The TV commentary can be provided to the server 36 as indicated at 67 or to the remote computer 42 as indicated at 69, wherein the TV feed is separately provided to the remote computer 42 or the TV feed and the signals from the wide area network are provided to a single assembly such as a settop box, Communications pertaining to the track channel can be received by the antenna 32 or otherwise provided directly to the server 36.

In another further embodiment, the remote fan can also select to hear the race leading participants regardless of whether or not they have been selected in the list 52. A selection field is indicated in the user interface 50 at 60. The selection field 60 includes a user selectable number of leading participants to listen to at 62. The selectable number 62 is adjustable from zero to any desired number of participants. A priority field 64 can also be provided and functions similar to the priority indicators described above. Thus, in the embodiment illustrated, if there exists a communication from one of the first three race leaders, and that team was not otherwise selected from the list 52, the communication will be played over the speaker of the remote computer 42 and the unique identifier 54 will be highlighted or otherwise identified to the remote fan in the list 52.

Current race statistics identifying the position of each of the race positions of the cars 12–18 can be provided as an input to the server 36, as indicated at 65. Based on the race statistics, the server 36 or the remote computer 42 can determine if a communication from a particular team meets the criteria of field 60.

In yet a further embodiment, the user interface 50 allows the remote fan to choose which team members of each team to listen to if a communication exists. In the embodiment illustrated, upon selection of the unique identifier 54 for a particular participating team, a list 70 listing the team members communicating on a team channel is provided. Typically, the team members include a driver 72, a team member 74 located in the pit area 28 and one or more spatters 76 also communicating on the team channel. The list 70 also includes corresponding selectable portions 78 for each of the team members 72, 74 and 76 communicating on the team channel. By using an input device, such as a mouse, the remote fan can select which team members 72, 74 and 76 of each team to listen to while filtering out communications of unwanted team members from that team. This feature is particularly useful at some race events where communications from spotters occur frequently; however, the information may not be particularly interesting to the race fan. By allowing the remote fan to select those communications of each team that he is interested in and filter out communications from other team members, audio heard from the race event 10 can be more enjoyable.

In the embodiment illustrated, the unique identifier 54 corresponds to the team member in the list 70 when that communication is being heard over the speaker of the remote computer 42. Thus, when the driver is being heard over the speaker, his/her name will appear flashing, highlighted or in bold in the list 52 as illustrated with respect to car number 64. Likewise, when the team member in the pit area is being heard, a suitable designation such as "PIT" will appear in conjunction with the car number.

In a further embodiment, some or all team communications can be stored for later playing. For instance, as explained above, priorities can be set so that some team communications will be heard over others. In the event, overlap exists in the communications such that one team is not heard because another team communication is being heard, the former communication audio signals can be stored (either at the server or at the remote listener's computer, discussed below) so that the listener can hear the communication at a later time. Any overlapping communications can be stored in this manner.

If desired, list 52 can include an identifier 53 that indicates a stored communication of the corresponding team. The identifier 53 can also indicate the team member speaking, for example, "D" for driver, "P" for pit, etc. In FIG. 2, a table 55 can be accessed indicating all of the stored communications for that team. The listener can then indicate which communication to play from the table 55. The indications in the table 55 can also include a time stamp or other signifier (e.g. a lap identifier for that team or referenced to the race leader) to give the listener information as to when the communication was made. The listener can individually play each desired communication, or alternatively, playback can begin with that communication and continue with other communications from other members of that team within a selected duration (from the first identified communication or from last played communication), which can be adjusted if desired at 57.

In one mode of operation, the stored communication can be played automatically when there are currently no other selected teams communicating. In another mode of operation, the listener can indicate playing when the listener desires, for instance, by activating the identifier through an input device such as a mouse. If during playback, a higher priority communication is received, the higher priority communication can be played immediately or stored automatically for later playback.

Figure 3:
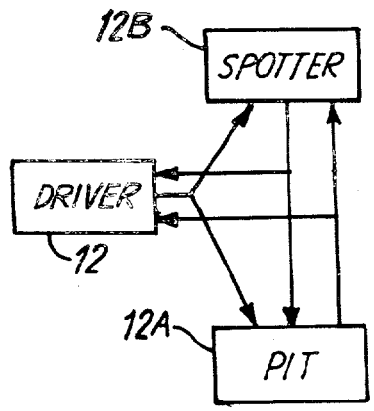
FIG. 3 is a schematic diagram illustrating a channel of communication for one team.

FIG. 3 illustrates communication between the team members of the team comprising car 12, the team member 12A in the pit area 28 and the spotter 12B. As stated above, the communications of these team members is herein considered a channel. To identify each of the team members in order to allow filtering using the list 70, suitable analog or digital identifiers are associated with the communications from each of the team members. For instance, if the team members communicate over a digital channel, a unique digital tag can be associated with the driver of car 12, the team member 12A in the pit area 28 and the spotter 12B. Based on the digital tag, the communication from that team member is played over the speaker of the remote computer 42 if that particular member has been selected in the list 70 of that team. In another embodiment, each of the team members can transmit on their own unique carrier frequency, but be able to receive communications from the other team members which are also transmitting on unique frequencies. In this manner, if a communication exists on a frequency corresponding to a team member selected in the list 70, that communication would be heard over the speaker of the remote computer 42. In this embodiment, although unique frequencies have been assigned to each of the team members, that set of unique frequencies is considered a team channel.

Figure 4:
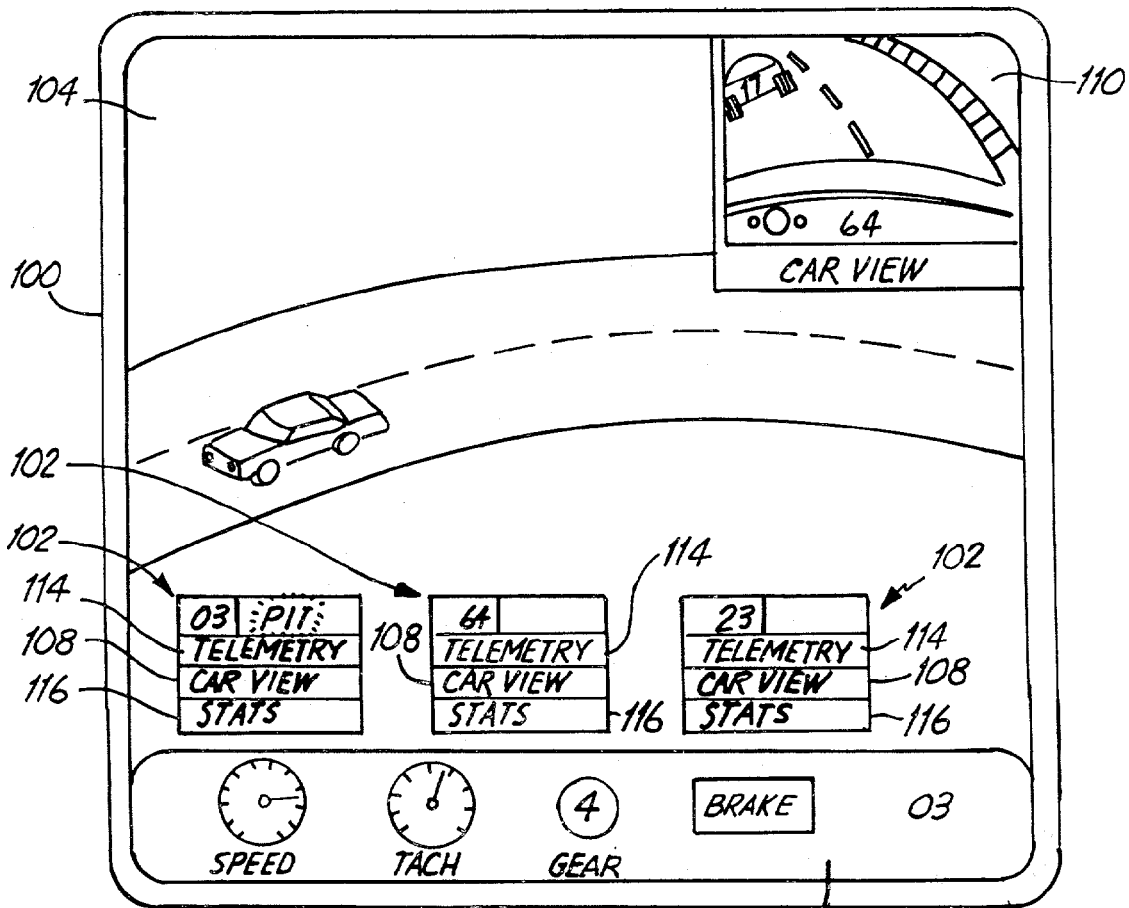
FIG. 4 is a monitor illustrating a form of user interfaces for remotely viewing and listening to a race.

FIGS. 1 and 4 illustrate other information that can be transmitted to a remote fan using the system of the present invention. FIG. 4 is a display or monitor 100 at the remote computer 42. During the race, the monitor 100 displays identifiers 102 for each of the participants, for example, those selected in the list 52. The identifiers 102 can be continuously provided on the display 100 or selected and displayed at the control of the remote fan. A major portion 104 of the monitor 100 can show the picture currently being received from the television broadcaster. As stated above, this signal can be provided to the server 36 as indicated at 67 or to the remote computer 42 as indicated at 69. In addition to the television broadcaster's view of the race event 10, one or more of the race cars 12–18 can be equipped with cameras as is commonly known in the art. Each of the signals from the cameras in the race cars 12–18 can be provided to the server 36 as indicated at 106, with the views of each of the cars 12–18 provided to the server 36, the remote fan can select one or more views from the car views 106 as he desires with the remote computer 42. In the embodiment illustrated, a portion 108 of each identifier 102 is identified as a "car view" for that particular car and is used to select the car view for display on the monitor 100. The selected car view then can be displayed in a portion 110 of the monitor 100 in conjunction with the view provided by the television broadcaster. If desired, the car view can be expanded to cover all of the monitor 100. In another embodiment, each of the car views can be provided in a list, similar to the list 52 illustrated in FIG. 2, and selected when desired by the remote fan.

In a further embodiment, the server 36 receives telemetry signals from each of the cars 12–18 indicating, for example, the speed of the car, the engine speed of the car, the current gear and when brakes are applied. This information is provided to the remote computer 42 and displayed on the monitor 100 such as indicated at 112. In the embodiment illustrated, the telemetry signals are received by the radio receiver 34. The remote fan selects which telemetry signals to display. In the embodiment illustrated, a portion 114 is provided for each of the identifiers 102 to select the corresponding telemetry signals of each car. If desired, a list similar to the list 52 described above, can be separately provided for the selection of telemetry signals.

In a further embodiment, team statistics can be separately selected and displayed when desired. In the embodiment illustrated, the statistics are selected through a portion 116 of each of the identifiers 102. The team statistics can include, for example, the participant's current position in the race, the top speed obtained during the race, the average speed during the race, the average speed for the last five laps, the pit times during the race and the average time in seconds behind the leader. These unique statistics for each of the teams are displayed on the monitor 100 when selected by the user using the remote computer 42. Each of the team statistics are provided to the server 36 as indicated at 65 and updated as necessary during the race.

Figure 5:
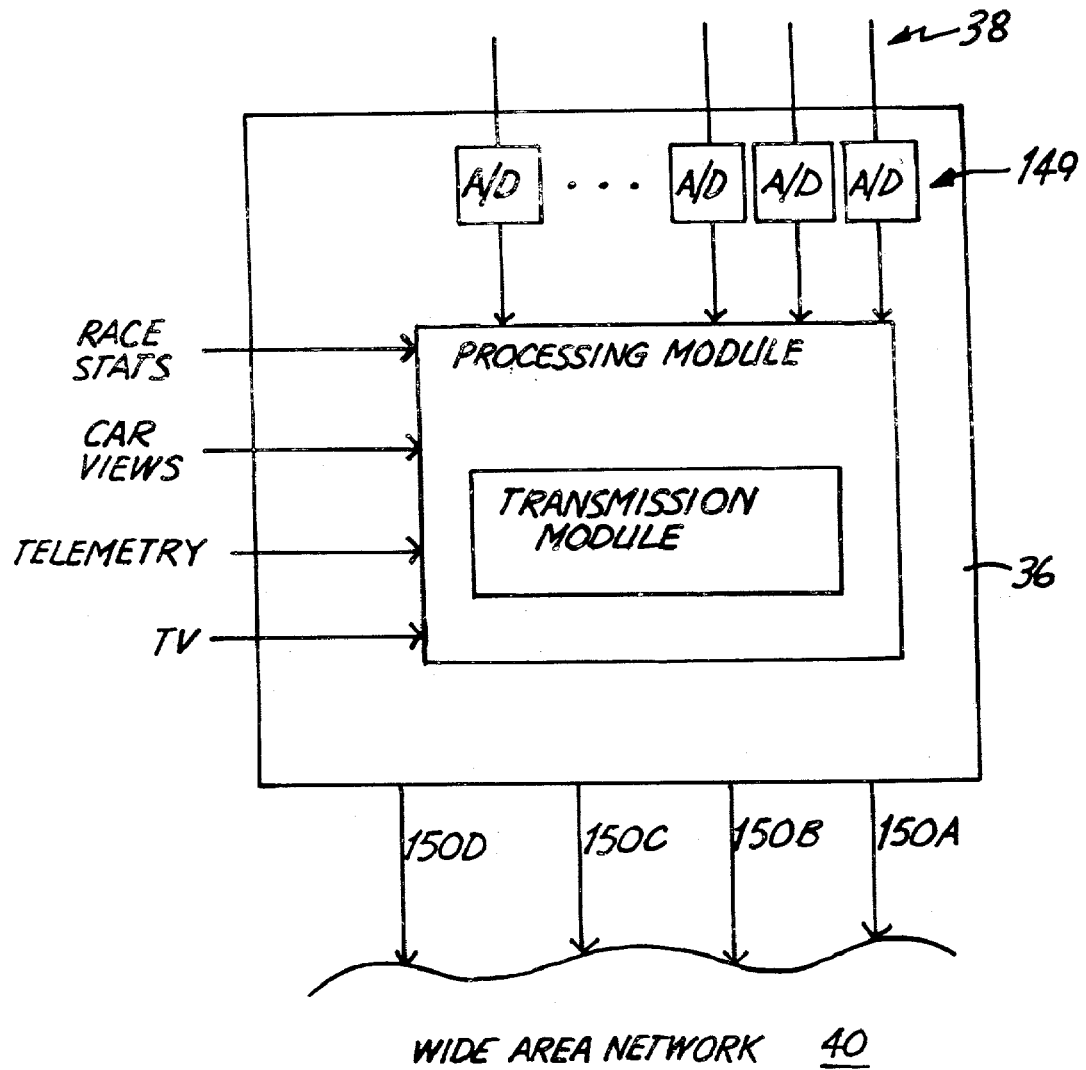
FIG. 5 is a block diagram of a server.

FIG. 5 illustrates an exemplary server 36 for transmission of race information, discussed above, through the wide area network 40 to the remote computers 42. The server 36 includes a processing module 120 that receives any or all of the audio signals 38 and stores the signals if necessary, the telemetry signals, the race statistics 65, the car views 106 and the television feed 67. The processing module 120 processes the information for transmission to the remote computers 42, which typically includes digitizing the signals and forming the digitized data into data packets that are sent through the wide area network 40 to the remote computers 42 through a transmission module 122. The use of transmitted data packets, which can be sent individually, or grouped as files, to provide substantially continuous viewing and/or listening from a remote location over the Internet is well known. One manufacturer using such technology includes RealNetworks, Inc. of Seattle, Wash., which produce REALAUDIO and REALVIDEO. These systems allow a user of a remote computer to select a particular "audio station" or "video station" from a server across the Internet. A data stream is then transmitted to the user whereat a receiving module provided on the user's computer converts the data stream for display through the monitor and/or output through the speaker.

Figure 6:
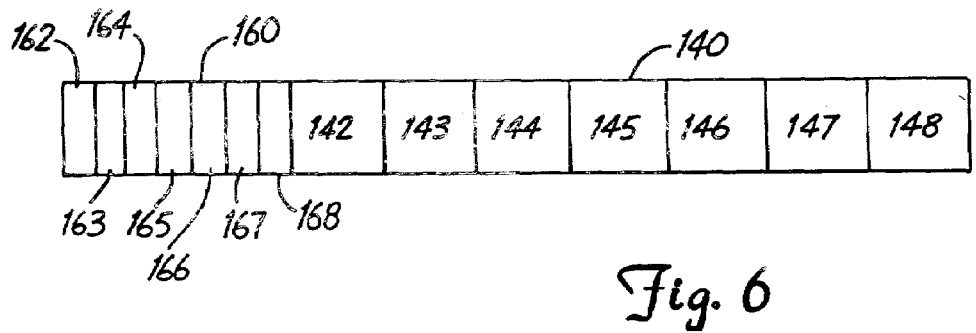
FIG. 6 is a representative view of a data packet.

In one embodiment of the present invention, the processing module 120 processes the information into data packets that include information for at least two different audio, video or telemetry signals for different teams. Referring to FIG. 6, an exemplary data packet 140 for audio signals is illustrated. It should be understood that the embodiment shown is for illustrative purposes only and that other data packets having alternative structures can be used in the present invention.

The data packet 140 includes portions 142, 143, 144, 145, 146, 147 and 148 corresponding to each of the team channels for the cars 12–18, respectively. In particular, the values contained in portions 142–148 are indicative of communication between the team members for each respective team. In the embodiment illustrated, analog-to-digital converters 149 are provided to convert the audio signals 38 to digital values, which are provided to the processing module 120. Of course, if the audio signals are digital, the analog-to-digital converters are not required. The processing module 120 receives the digital values and forms data packets 140 that are transmitted to the remote computer 42 through the wide area network 40. In the exemplary embodiment, the length of the data packet 140 is a function of the number of team channels present. Typically, the length of the data packet 140 will be limited by the throughput of the connections forming the wide area network 40. In some situations, it may be necessary to form the different data packets for different sets of teams. The remote computer user would then select which stream of data packets to receive. This is represented in FIG. 5 as data lines 150A, 150B, 150C and 150D. For example, data packets for data line 150A can be for a first set of five preselected team channels, whereas data packets for data lines 150B and 150C can be for a second and third set of preselected team channels. In contrast, data packets for data line 150D can be for team channels dynamically selected. For example, the team channels present in data line 150D can be the top five cars leading the race, wherein the processing module 120 forms the data packets for data line 150D from the race statistics 65. Alternatively, the team channels present in data line 150D can be chosen based on other criteria including requests made by the remote computers 42.

In a further embodiment, the data packet 140 includes a portion 160 having subportions 162, 163, 164, 165, 166, 167 and 168 corresponding to each of the portions 142–148. In particular, the values present in subportions 162–168 are used to identify the particular team member of each team that is talking during the instant of time that the data packet 140 represents. As explained above, a race team can include a driver, a pit member and a spotter. The unique value is associated with each of these members and used in the portions 162–168 to identify the team member that is talking. In effect, the portions 162–168 comprise identifiers or tags for each of the portions 142-148. In one exemplary embodiment, one or two bytes can be used for each of the portions 142–148, whereas one or two bytes can be used for the portion 150 wherein two bits are associated with each portion 162–168.

In the data packet 140 described above, each team is identified by its position in the data packet. It should be understood that further information can be transmitted to the remote computer 42 so that the remote computer 42 can properly determine which teams comprise the data packet, Even in the case of data line 150D, the server 36 can transmit information to the remote computers 42 indicating which teams currently comprise the corresponding data packets. In this manner, unique identifiers need not be associated with each team or team member as data is transmitted, which reduces the amount of data transmitted. However, in an alternative embodiment of the present invention, identifiers can be associated with each data packet identifying which teams and/or team members are associated with each corresponding data packet. This allows the data packet to only contain teams currently communicating at any given instant. Accordingly, the data packets can be of varying length. Although described above with respect to team audio signals, it should be understood other audio signals such as the television feed 67 can be included. In addition, similar data packets can be formed for video and telemetry information, or alternatively, integrated into the data packet with the audio signals. Compression techniques can be used to minimize the length of the data packet, if desired.

In yet a further alternative embodiment, each data packet can be for only one team channel or team member. Identifiers can be included to identity which team or team member the data packet is associated with. If desired, any of the above-described data packets can be transmitted using multiplex transmission communication techniques incorporating, but not limited to, time division, frequency division or phase division.

Figure 7:
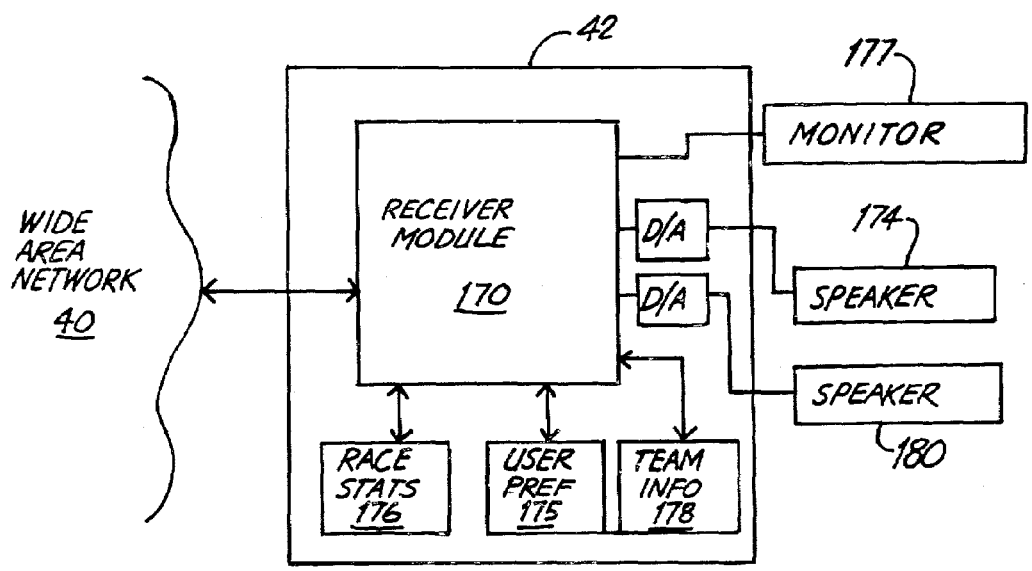
FIG. 7 is a block diagram of remote computer.

Referring to FIG. 7, the remote computer 42 includes a receiver module 170. The receiver module 170 receives the data packets and processes the information contained therein. The receiver module 170 receives the data packets according to any of the transmission techniques described above. In one embodiment, the receiver module 170 functions as a filter and only allows those teams that have been selected (check 56) to be heard over a speaker 174. The selections can be stored at 175. In a further embodiment, the selections 175 can include priority and team member selections. The receiver module 170 processes each data packet according to the assigned priority and team members to be heard, as discussed above. The signals can be stored for later playback when desired.

Race statistics 65 are periodically transmitted from the server 36 to the remote computer 42 and stored at 176. The race statistics 176 are accessed by the user for display on a monitor 177 as desired and used to assign priority in accordance with values selected at 62 and 64 in FIG. 2.

In another embodiment, at least some of the filtering is performed by the server 36. For example, data line 150D represents transmission of audio signals for a selected number of teams leading the race. Thus, although the server 36 receives all communications from the receiver 32, only those communications pertaining to the selected number of leading teams are transmitted to the receiver module 170. In this embodiment, the receiver module 170 can pass all communications to the speaker 174, or, if desired, further filter the communications pursuant to stored preferences.

In one preferred method of operation, the receiver module 170 can be used for a plurality of race events. In particular, information regarding each of the teams for use in the user interface 50 and display of FIG. 4 is provided to the remote computer 42 over the wide area network 40, for example, from the server 36 or another remote computer, and stored at 178. The remote computer user then selects those audio channels of interest, assigning priority levels and choosing which team members will be heard, if desired. Data packets and race statistics are received periodically. As data packets are received and processed, the user interface 50 or display of FIG. 4 is updated to indicate which audio channel and/or team member is being heard over the speaker 174.

If desired, more than one speaker 174 can be used for playing audio signals. FIG. 7 illustrates a second speaker 180. In one embodiment, the speaker 180 is used for playing audio signals from a first set of one or more teams, while the speaker 174 is used for playing audio signals from a second set of one or more teams. Upon receipt of the data representative of the audio signals, the receiver module 170 filters the signals to each of the speakers 174 and 180. In another embodiment, the speakers 174 and 180 can be used when assigned priority values would cutoff an audio signal being played through the speakers. For instance, if communications are currently being heard from a priority "2" team through the speaker 174 of the remote computer 42 and communication starts for a priority "1" team, the audio being played over the speaker 174 can continue, while the communication from the priority "1" team will be played over the speaker 180. Although described with respect to the use of two speakers, it should be understood that three, four or more speaker systems can be used similarly.

Although the present Invention has been described with reference to preferred embodiments, workers skilled in the art will recognize that changes may be made in form and detail without departing from the spirit and scope of the invention.

What is claimed is:

1. A computer-implemented method to allow a remote computer user to listen to teams in a race event, the method comprising:
   receiving audio signals at a server from a plurality of audio sources at the race event when audio signals from at least two different audio sources occur at the same time;
   transmitting information related to at least some of the audio signals to a remote computer remote from the server via a network;
   assigning different priority values to at least two different audio sources from the race event to be heard as selected from indications by remote computer user; and
   playing the audio signals from the race event using the remote computer and the transmitted information as a function of the priority values when audio signals from at least two different audio sources occur at the same time, wherein the step of playing includes playing audio signals as a function of a position of a team in the race.

2. The computer-implemented method of claim 1 wherein the step of assigning includes assigning a priority value for audio signals from teams as a function of position in the race.

3. The computer-implemented method of claim 1 wherein a number of teams that are played as a function of position is selectable.

4. A computer-implemented method to allow a remote computer user to listen to teams in a race event, the method comprising:
   receiving audio signals at a server from a plurality of audio sources at the race event when audio signals from at least two different audio sources occur at the same time;
   transmitting at least some of the audio signals to a remote computer remote from the server via a network;
   assigning different priority values to at least two different audio sources from the race event to be heard as selected from indications by the remote computer user; and
   playing the audio signals from the race event using the remote computer as a function of the priority values when audio signals from at least two different audio sources occur at the sane time;
   storing audio signals pertaining to a first audio source when the first audio source and a second source are simultaneously communicating, and wherein playing the audio signals from the race event using the remote computer includes playing the audio signals from the second audio source; and
   playing the audio signals at the remote computer from the first audio source using the stored audio signals after the audio signals from the second audio source have been played.

5. The computer-implemented method of claim 4 wherein the step of playing includes playing audio from a first audio source of said at least two different audio sources over a first speaker and playing audio from a second audio source of said at least two different audio sources over a second speaker.

6. The computer-implemented method of claim 4 wherein the step of playing includes filtering the audio signals as a function of priority values, wherein the filtering is performed by the remote computer.

7. The computer-implemented method of claim 4 wherein the step of playing includes filtering the audio signals as a function of priority values, wherein the filtering is performed by the server.

8. The computer-implemented method of claim 4 and further comprising visually identifying to the user a team being heard over a speaker.

9. The computer-implemented method of claim 4 wherein each team comprises a plurality of team members, and wherein each of the steps of playing includes playing audio signals as a function of whether the team member has been selected.

10. The computer-implemented method of claim 9 and further comprising storing information indicative of priority values of the teams and the selected team members at the remote computer.

11. The computer-implemented method of claim 9 and further comprising storing information indicative of priority values of the teams and of the selected team members at the server remote from the remote computer.

12. The computer-implemented method of claim 4 wherein the audio sources comprise teams, and the method further comprising:
   displaying an identifier associated with at least one of the teams indicating that audio signals for said at least one of the teams are stored.

13. The computer-implemented method of claim 4 and further comprising:
   displaying identifiers for individual team members associated with each team in the race; and
   selecting individual team members for listening based on the identifiers being displayed.

14. The computer implemented method of claim 4 and visually rendering to the user an indication that the stored communications exist between the first team.

15. The computer implemented method of claim 4 wherein the step of playing includes playing the audio signals based on a position of a team in the race.

16. A computer-implemented method to allow a user to listen to teams in a race event using a remote computer being located remote from server, the method comprising:

receiving from the user an indication of at least one highest priority team that the user of the remote computer wants to hear over other teams;

receiving at the server communications between a first team at the race event, the first team not being said at least one highest priority team that the user of the remote computer wants to hear over other teams at the race event;

transmitting information from the server to the remote computer indicative of the communications between the first team, the server and remote computer being in communication with each other over the computer network;

audibly rendering on the remote computer to the user the information indicative of the communications between the first team;

receiving at the server communications between said at least one highest priority team that the user of the remote computer wants to hear over other teams at the race event while receiving communications between the first team;

transmitting information from the server to the remote computer indicative of the communications between said at least one highest priority team that the user of the remote computer wants to hear over other teams at the race event;

storing information indicative of the communications between the first team;

audibly rendering on the remote computer to the user the information indicative of communications between said at least one highest priority team that the user of the remote computer wants to hear over other teams at the race event; and audibly rendering on the remote computer to the user the information indicative of the stored communications between the first team after audibly rendering on the remote computer to the user the information indicative of communications between said at least one highest priority team that the user of the remote computer wants to hear over other teams at the race event.

17. The computer implemented method of claim 16 wherein each step comprising transmitting comprises transmitting information from the server to the remote computer over the Internet.

18. The computer implemented method of claim 16 and further comprising rendering to the remote computer user an identifier corresponding to said at least one highest priority team that the user of the remote computer wants to hear over other teams at the race event in accordance with audibly rendering on the remote computer to the user the information indicative of communications between said at least one highest priority team that the user of the remote computer wants to hear over other teams at the race event.

19. The computer-implemented method of claim 18 wherein rendering to the remote computer user the identifier comprises visually rendering to the remote computer user the identifier.

20. The computer-implemented method of claim 16 wherein the remote computer comprises a computing device, and wherein each of the steps of transmitting comprises transmitting over a phone communications network.

21. The computer-implemented method of claim 20 wherein the computing device comprises a personal computer.

22. The computer implemented method of claim 16 and further comprising:

storing information indicative of the communications between other teams; and visually rendering to the user indications that the stared information indicative of the communications exists for one or more of the other teams.

23. A computer-implemented method to allow a user to listen to teams in a race event, the method comprising:

receiving from the user an indication of at least one highest priority team that a user using a computing device wants to hear over other teams;

receiving at the computing device communications between a first team at the race event, the first team not being said at least one highest priority team that the user of the computing device wants to hear over other teams at the race event;

audibly rendering on the computing device to the user the information indicative of the communications between the first team;

receiving at the computing device communications between said at least one highest priority team that the user of the computing device wants to hear over other teams at the race event while receiving communications between the first team;

storing information indicative of the communications between the first team;

audibly rendering on the computing device to the user the information indicative of communications between said at least one highest priority team that the user of the computing device wants to hear over other teams at the race event; and audibly rendering on the computing device to the user the information indicative of the stored communications between the first team after audibly rendering on the computing device to the user the information indicative of communications between said at least one highest priority team that the user of the computing device wants to hear over other teams at the race event.

24. The computer-implemented method of claim 23 and further comprising visually rendering a first identifier for said at least one highest priority team while visually rendering a second identifier for the first team when the communications of the first team are being rendered.

25. The computer-implemented method of claim 24, wherein the first identifier is rendered differently than the second identifier.

26. The computer-implemented method of claim 25 and further comprising visually rendering an image of the race on the computing device while audibly rendering communications.

27. The computer-implemented method of claim 25 and further comprising receiving an indication from the user as to which image of the race to visually render.

28. The computer-implemented method of claim 27 wherein visually rendering an image of the race comprises an image of the race pertaining to a view from a car.

29. The computer-implemented method of claim 23 and further comprising receiving race statistics about the race at the computing device and visually rendering the race statistics.

30. The computer-implemented method of claim 29 wherein visually rendering the race statistics comprises visually rendering information about a teams performance relative to a leader of the race.

31. The computer-implemented method of claim 23 wherein each of the steps of receiving communications comprises receiving said communications from a server over a network.

32. The computer-implemented method of claim 23 wherein receiving from the user an indication includes receiving from the user an indication that the first team is a priority team that the user wants to hear over other teams, the first team having a priority less than said at least one highest priority team.

33. The computer-implemented method of claim 32 wherein receiving from the user an indication includes receiving from the user an indication that a third team is a priority team that the user wants to hear over other teams, the third team having a priority less than said at least one highest priority team and said first team.

34. The computer-implemented method of claim 23 and further comprising visually rendering a list of priority teams that a user using a computing device wants to hear over other teams, while visually rendering an identifier for the corresponding team having communications being audibly rendered.

35. A system to allow a user to listen to audio sources in a race event, the system comprising:
a server configured to receive communications from audio sources at a race event, the communications comprising communications between teams in the race; and
a plurality of computing devices, each computing device configured to receive information from the server, the information comprising the communications from the audio sources, each computing device comprising:
a receiver module configured to receive the information from the server;
a user interface;
a storage device configured to store communications of teams;
a speaker; and
a processor operably coupled to the interface, the storage device, the receiver and the speaker, the processor configured to:
receive from the user an indication of at least one highest priority team that a user using a computing device wants to hear over other teams,
process communications between a first team at the race event, the first team not being said at least one highest priority team that the user of the computing device wants to hear over other teams at the race event,
audibly render to the user the information indicative of the communications between the first team,
process communications between said at least one highest priority team that the user of the computing device wants to hear over other teams at the race event while receiving communications between the first team,
store information indicative of the communications between the first team,
audibly render to the user the information indicative of communications between said at least one highest priority team that the user of the computing device wants to hear over other teams at the race event, and
audibly render to the user the information indicative of the stored communications between the first team after audibly rendering to the user the information indicative of communications between said at least one highest priority team that the user of the computing device wants to hear over other teams at the race event.

36. The system of claim 35 wherein the interface of each computing device is configured to receive indications from the user pertaining to selecting stored communications to audibly render, and wherein the processor of each computing device is configured to cause the selected stored communications to be audibly rendered based on the indications received.

37. The system of claim 36 wherein the interface of each computing device comprises a keyboard.

38. The system of claim 37 wherein each computing device further comprises a monitor operably coupled to the processor, and wherein the processor of each computing device is configured to visually render on the corresponding monitor a list of the priority teams selected by the user while visually rendering on the corresponding monitor an identifier for the corresponding team having communications being audibly rendered.

39. The system of claim 38 wherein the module of each computing device is configured to visually render an image of the race on the corresponding monitor while audibly rendering communications.

40. The system of claim 39 wherein the image of the race comprises an image of the race pertaining to a view from a car.

41. The system of claim 40 wherein the processor of each computing device is further configured to visually render race statistics of the race.

42. The system of claim 41 wherein the race statistics comprise information about a teams performance relative to a leader of the race.

43. The system of claim 35 wherein the processor of each computing device is configured to receive from the user an indication that the first team is a priority team that the user wants to hear over other teams, the first team having a priority less than said at least one highest priority team.

44. The system of claim 43 wherein the processor of each computing device is configured to receive an indication from the user that a third team is a priority team that the user wants to hear over other teams, the third team having a priority less than said at least one highest priority team and said first team.

45. A computing device to allow a user to listen to teams in a race event, the computing device comprising:
a processor;
an interface operably coupled to the processor and configured to receive from the user an indication of priority teams having different priority that a user using a computing device wants to hear over other teams;
a speaker operably coupled to the processor; and
a module configured to be executed by the processor and configured to audibly render through the speaker communications of priority teams when received based on priority, and audibly render through the speaker communications of another team based on a position of said another team in the race.

46. The computing device of claim 45 wherein the module is configured to assign a priority value for teams as a function of position in the race and audibly render communications of said teams based on the priority value relative to the priority of the priority teams.

47. The computing device of claim 45 wherein the module is configured to adjust a number of teams that are played as a function of position.

* * * * *